No. 720,646. PATENTED FEB. 17, 1903.
H. WESTFAHL.
COLOR EXHIBITING DEVICE.
APPLICATION FILED SEPT. 3, 1901.
NO MODEL.
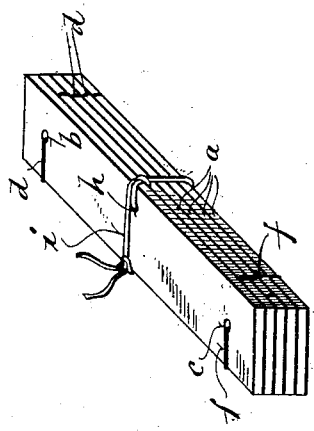
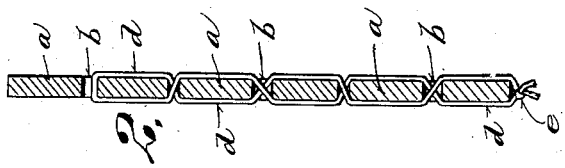
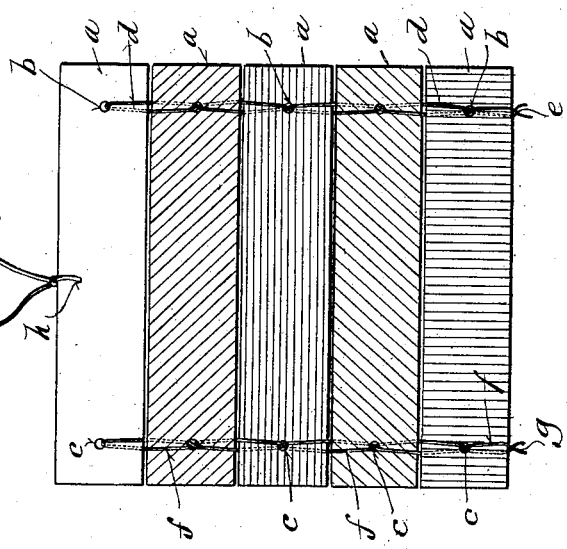
Witnesses:
Geo. W. Young,
B. C. Roloff.
Inventor
Henry Westfahl
By H. G. Underwood
Attorneys

UNITED STATES PATENT OFFICE.

HENRY WESTFAHL, OF MILWAUKEE, WISCONSIN, ASSIGNOR TO PATTON PAINT COMPANY, OF MILWAUKEE, WISCONSIN.

COLOR-EXHIBITING DEVICE.

SPECIFICATION forming part of Letters Patent No. 720,646, dated February 17, 1903.

Application filed September 3, 1901. Serial No. 74,114. (No model.)

*To all whom it may concern:*

Be it known that I, HENRY WESTFAHL, a citizen of the United States, and a resident of Milwaukee, in the county of Milwaukee and State of Wisconsin, have invented certain new and useful Improvements in Color-Exhibiting Devices; and I do hereby declare that the following is a full, clear, and exact description thereof.

My invention has especial reference to devices for exhibiting different paints, stains, or colors to aid painters and others in making selections therefrom; and it consists in certain peculiarities of construction and combination of parts, as will be fully set forth hereinafter in connection with the accompanying drawings and subsequently claimed.

In the said drawings, Figure 1 is a representation of one of my said devices fully opened out adapted for showing five different colors. Fig. 2 is a sectional view, on an enlarged scale, of a like device for showing three colors. Fig. 3 is a perspective view of the device shown in Fig. 1 folded and tied for storage or transportation.

Referring by letter to the drawings, $a\ a\ a$ represent strips of any suitable material, preferably of wood, similar to that of the material to be painted or stained in actual use. In shape these strips are oblong parallelograms of equal size, and each strip is formed with two holes $b\ c$ therethrough, one hole being adjacent to each end of the said strip. Through all the holes $b\ b$ in line with each other at one end of the strips $a\ a$ and between the adjacent edges of each two successive strips a cord $d$ is threaded back and forth, the two ends of the cord crossing each other through each hole and between each two strips, as most plainly shown in the enlarged view, Fig. 2, said ends being knotted together below the lower or outer edge of the lowermost strip $a$, as shown at $e$. Another cord $f$ is similarly threaded back and forth through the holes $c\ c$ and between the adjacent edges of the said strips at the other end of the strips, the ends of said cord $f$ being similarly knotted beneath the lower or outer edge of the lowermost strip, as shown at $g$. By reason of this construction the said strips $a\ a$ are hinged together, so as to fold either way, and thus by a proper arrangement of the different colors and the requisite number of strips any desired color can be shown, and with a sufficient number of the variously-colored strips any desired contrasting colors can be brought into juxtaposition, which will be found a great aid in the selection of colors for painting the different portions of a house or other structure, for example, this being further aided by the fact that the stain or color is shown upon wood the same as it would appear in actual use upon the proposed structure. The uppermost strip $a$ is preferably formed with a hole $h$ therethrough intermediate of the holes $b\ c$ and a cord $i$ secured through this hole $h$, to be tied when the strips $a$ are all folded together to secure the package in small space, as shown in Fig. 3. To facilitate the contrasting effect of different colors with the least number of strips $a$, the opposite faces of said strips may, if desired, have different colors thereon arranged in a different order on one side than on the other, the number of strips and the arrangement of colors thereon being a matter of convenience or selection in any given case.

Having thus described my invention, what I claim as new, and desire to secure by Letters Patent, is—

1. A color-exhibiting device, comprising a series of strips of like size, stained or painted with different colors on their surfaces, and hinged together by cords adjacent to their ends, to facilitate their folding together as desired, and secure them in their relative positions.

2. A color-exhibiting device, comprising a series of strips, of like size stained or painted with different colors on their surfaces, and each having a pair of holes therethrough, one hole of each pair being adjacent to the end of each strip, and all the holes at the opposite ends of all the strips being in line with each other, in combination with a pair of cords, the ends of each cord, at the opposite ends of the strips, being threaded through the said holes, and between the adjacent edges of each two successive strips, so as to cross each other at these points, and then knotted together below the lower or outer end of the lowermost strip of the series, and with another cord secured to the uppermost strip of the series, intermediate of the first-named cords, for suspending the device when opened out, and for tying around the strips when folded.

3. A color-exhibiting device, comprising a series of strips stained or painted with different colors on their surfaces, and flexibly hinged together, whereby they may be opened out to show all the colors, partially folded to bring contrasting colors into juxtaposition, or completely folded, one strip upon another, to reduce the device to the least possible size for storage or shipment.

4. A color-exhibiting device, comprising a series of flexibly-united wooden strips, stained with different colors on their surfaces, and capable of being folded together one upon the other, the uppermost strip having a central hole therethrough, in combination with a loose-ended cord, passed through said hole, and centrally secured about the edge of said strip, the loose ends of said cord being adapted to be wound around the folded package of united strips, in opposite directions, and tied to secure said package in the most reduced and compact space with each strip in complete contact with the next adjacent strip of the series.

5. A package of strips of uniform shape and size but of different colors, flexibly united adjacent to their ends, and folded together one upon the other in close contact, in combination with a cord secured at its center to the center of the uppermost strip of the series and with its ends carried, in opposite directions, around the package of folded strips and tied together.

In testimony that I claim the foregoing I have hereunto set my hand, at Milwaukee, in the county of Milwaukee and State of Wisconsin, in the presence of two witnesses.

HENRY WESTFAHL.

Witnesses:
H. G. UNDERWOOD,
B. C. ROLOFF.